United States Patent
Wang et al.

(10) Patent No.: US 11,356,522 B2
(45) Date of Patent: Jun. 7, 2022

(54) DATA TRANSMISSION METHOD, NETWORK DEVICE, TERMINAL DEVICE, AND COMPUTER READABLE STORAGE MEDIUM

(71) Applicant: BOE TECHNOLOGY GROUP CO., LTD., Beijing (CN)

(72) Inventors: Xiaohong Wang, Beijing (CN); Hui Rao, Beijing (CN); Xin Li, Beijing (CN); Kejun Hu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/392,495

(22) Filed: Apr. 23, 2019

(65) Prior Publication Data
US 2020/0099761 A1   Mar. 26, 2020

(30) Foreign Application Priority Data
Sep. 21, 2018  (CN) .......................... 201811109680.5

(51) Int. Cl.
H04L 67/55 (2022.01)
H04L 61/2514 (2022.01)
H04L 12/46 (2006.01)
H04L 61/10 (2022.01)
H04L 67/562 (2022.01)

(52) U.S. Cl.
CPC .......... *H04L 67/26* (2013.01); *H04L 12/4633* (2013.01); *H04L 61/10* (2013.01); *H04L 61/2514* (2013.01); *H04L 67/2809* (2013.01)

(58) Field of Classification Search
CPC . H04L 67/26; H04L 67/2809; H04L 12/4633; H04L 61/10; H04L 61/2514
See application file for complete search history.

(56) References Cited

U.S. PATENT DOCUMENTS

2018/0191666 A1* 7/2018 Rahman .............. H04L 61/1541
2018/0248804 A1* 8/2018 Nandy .................... H04L 67/14
(Continued)

FOREIGN PATENT DOCUMENTS

| CN | 101175029 A | 5/2008 |
| CN | 102984068 A | 3/2013 |

(Continued)

OTHER PUBLICATIONS

Office Action issued in corresponding Chinese Patent Application No. 201811109680.5, dated Nov. 25, 2020.

*Primary Examiner* — Jason D Recek
(74) *Attorney, Agent, or Firm* — McDermott Will & Emery LLP (57) ABSTRACT

The present disclosure provides a data transmission method, a network device, a terminal device, and a computer readable storage medium, the data transmission method including: on a first network side, providing first data to a first network address in a first network; determining, based on mapping of first network addresses in the first network and second network addresses in a second network, a second network address according to the first network address; and transmitting the first data to a terminal device located at the determined second network address in the second network based on a Message Queue Telemetry Transmission (MQTT) protocol.

10 Claims, 7 Drawing Sheets

(56) References Cited

U.S. PATENT DOCUMENTS

2018/0300124 A1* 10/2018 Malladi .................. H04L 12/283
2018/0367646 A1* 12/2018 Seward .................. H04L 69/329
2020/0067865 A1*  2/2020 Jimenez ................. H04L 67/26
2020/0092121 A1*  3/2020 Skillermark ........ H04L 12/1886
2020/0153789 A1*  5/2020 Nalluri ................... H04L 67/34

FOREIGN PATENT DOCUMENTS

| | | |
|---|---|---|
| CN | 104601665 A | 5/2015 |
| CN | 105656847 A | 6/2016 |
| CN | 107623613 A | 1/2018 |
| WO | 2018/157916 A1 | 9/2018 |

* cited by examiner

DATA TRANSMISSION METHOD, NETWORK DEVICE, TERMINAL DEVICE, AND COMPUTER READABLE STORAGE MEDIUM

CROSS-REFERENCE TO RELATED APPLICATION(S)

This application claims priority to the Chinese Patent Application No. 201811109680.5, filed on Sep. 21, 2018, which is incorporated herein by reference in its entirety.

TECHNICAL FIELD

The present disclosure relates to the field of data transmission technologies, and more particularly, to a data transmission method, a network device, a terminal device, and a computer readable storage medium.

BACKGROUND

In an early Internet of Things (IoT) system, a server and a terminal device operate in the same network, and the server accesses application services deployed on the terminal device through the network to manage and monitor the terminal device.

Currently, with the changes in usage scenarios of IoT devices, terminal devices are more and more widely distributed, and a server and a terminal device may operate in different networks, which makes the server's access to the terminal device has challenges.

SUMMARY

The present disclosure provides a data transmission method, a network device, a terminal device, and a computer readable storage medium.

According to an aspect of the present disclosure, there is provided a data transmission method, comprising: on a first network side, providing first data to a first network address in a first network;

determining, based on mapping of first network addresses in the first network and second network addresses in a second network, a second network address according to the first network address; and transmitting the first data to a terminal device located at the determined second network address in the second network based on a Message Queue Telemetry Transmission (MQTT) protocol.

In an example, before determining the second network address, the method further comprises: establishing mapping of the first network addresses in the first network and the second network addresses in the second network by:

configuring, for each terminal device in the second network, a mapped virtual terminal device in the first network, and configuring, for a second network address of each terminal device in the second network address, a mapped first network address of the virtual terminal device in the first network.

In an example, providing first data to a first network address in a first network comprises:

providing the first data to a virtual terminal device located at the first network address in the first network.

In an example, the data transmission method further comprises:

receiving second data from a terminal device in the second network based on the MQTT protocol;

determining, based on the mapping of the first network addresses in the first network and the second network addresses in the second network, a first network address according to a second network address of the terminal device which provides the second data in the second network;

providing the second data to the determined first network address in the first network; and obtaining the second data from the determined first network address.

In an example, transmitting the first data to a terminal device located at the determined second network address in the second network based on an MQTT protocol comprises: based on the MQTT protocol, encapsulating the first data into content of a first topic; and publishing the content of the first topic, so that a terminal device which is located at the determined second network address in the second network and subscribes to the first topic is capable of receiving the content of the first topic and obtaining the first data from the content of the first topic.

In an example, receiving second data from a terminal device in the second network based on the MQTT protocol comprises: based on the MQTT protocol, pre-subscribing to a second topic related to the second data;

receiving published content of the second topic, wherein the content of the second topic originates from the terminal device in the second network; and obtaining the second data from the content of the second topic.

According to another aspect of the present disclosure, there is provided a data transmission method, comprising: on a second network side, receiving, at a second network address in a second network, first data from a network device located at a first network address in a first network based on a Message Queue Telemetry Transmission (MQTT) protocol, wherein the first network address is mapped to the second network address; and providing the first data to a respective terminal application.

In an example, the data transmission method further comprises: transmitting second data to the network device located at the first network address in the first network based on the MQTT protocol.

In an example, receiving first data from a network device located at a first network address in a first network comprises: based on the MQTT protocol, pre-subscribing to a first topic related to the first data;

receiving published content of the first topic, wherein the content of the first topic comprises the first data from the network device located at the first network address in the first network; and extracting the first data from the content of the first topic.

In an example, transmitting second data to the network device located at the first network address in the first network based on the MQTT protocol comprises: based on the MQTT protocol, encapsulating the second data into content of a second topic; and publishing the content of the second topic, so that a network device in the first network which subscribes to the second topic and is located at the first network address is capable of receiving the content of the second topic and obtaining the second data from the content of the second topic.

According to another aspect of the present disclosure, there is provided a network device, comprising a memory and a processor, the memory having stored therein instructions executable by the processor, wherein the instructions, when executed by the processor, cause the processor to perform the data transmission method on the first network side described above.

According to another aspect of the present disclosure, there is provided a terminal device, comprising a memory and a processor, the memory having stored therein instructions executable by the processor, wherein the instructions, when executed by the processor, cause the processor to perform the data transmission method on the second network side described above.

According to another aspect of the present disclosure, there is provided a computer readable storage medium, having stored thereon a computer program, wherein the computer program, when executed by a processor, implements the data transmission method on the first network side described above.

According to another aspect of the present disclosure, there is provided a computer readable storage medium, having stored thereon a computer program, wherein the computer program, when executed by a processor, implements the data transmission method on the second network side described above.

BRIEF DESCRIPTION OF THE ACCOMPANYING DRAWINGS

In order to more clearly illustrate the technical solutions in the embodiments of the present disclosure, the accompanying drawings to be used in the description of the embodiments of the present disclosure will be briefly described below.

DETAILED DESCRIPTION

The embodiments of the present disclosure will be described in detail below, and examples of the embodiments are illustrated in the accompanying drawings, wherein the same or similar reference signs are used to refer to the same or similar elements or elements having the same or similar functions. The embodiments described below with reference to the accompanying drawings are intended to be illustrative only, and are only used to explain the present disclosure, but are not to be construed as limiting the present disclosure.

Firstly, several terms in the present disclosure will be introduced and explained.

An MQTT protocol is a "lightweight" communication protocol based on a publishing/subscription mode, which is built on the TCP/IP protocol. As a low-overhead and low-bandwidth instant messaging protocol, the MQTT protocol provides real-time and reliable messaging services for connection with remote devices using few codes and a limited bandwidth.

The MQTT protocol may be implemented by communication between a client and a server side. In a communication process, there are three kinds of identities in the MQTT protocol: a publisher, a broker (i.e., a server), and a subscriber. Here, the client may have the identity of the publisher and/or subscriber of messages, and the server may have the identity of the broker of the messages.

The message transmitted using MQTT has two parts: topic and payload:

(1) Topic may be understood as type of the message, and after the subscriber subscribes to the topic, the subscriber may receive content (i.e., the payload) of messages of the topic;

(2) Payload may be understood as the content of the message, referring to the content to be used by the subscriber.

In current IoT data transmission architecture, terminal devices are deployed in a centralized manner. The terminal devices are usually deployed in the same network (for example, the intranet) as the servicer. The terminal devices may be connected directly to an IoT service center on the servicer for communication, or may be connected to the IoT service center on the server for communication through a gateway device. The IoT service center on the server side may search for and add new terminal devices through the intranet to realize functions of managing, collecting and monitoring the terminal devices.

However, with the changes in usage scenarios of IoT devices, terminal devices are more and more widely distributed, and a terminal device and the server may not necessarily operate in the same network. In this case, there is a challenge in implementing communication between the server side and the terminal device.

The present disclosure provides a data transmission method, a network device, a terminal device, and a computer readable storage medium, which are capable of realizing data transmission from a network device in a first network to a terminal device in a second network.

The technical solutions of the present disclosure and how the technical solutions of the present disclosure solve the above technical problems will be described in detail below with reference to specific embodiments. The following specific embodiments may be combined with each other, and the same or similar concepts or processes may not be described in detail in some embodiments. The embodiments of the present disclosure will be described below with reference to the accompanying drawings.

Figure 1:
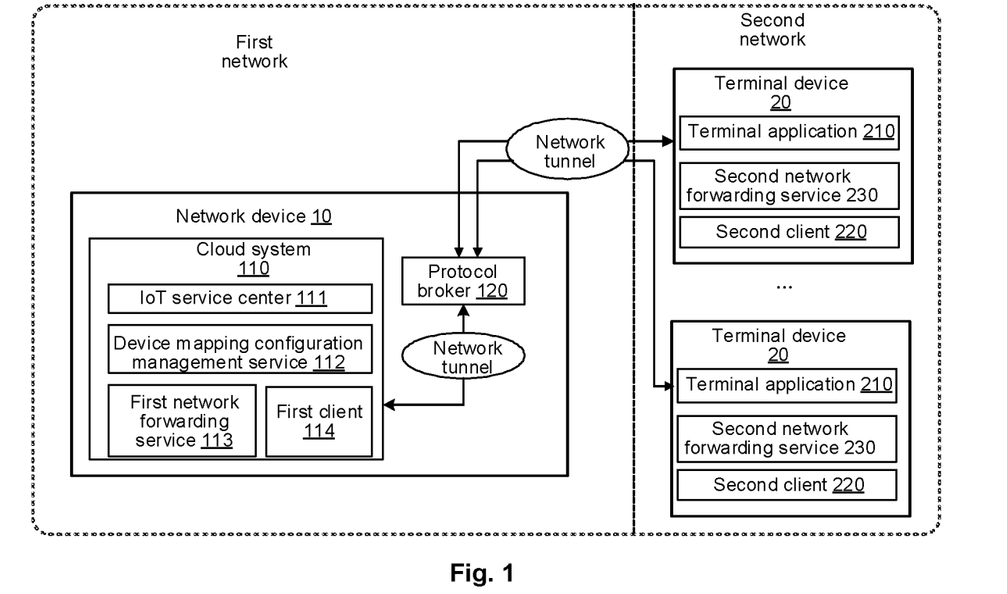
FIG. 1 is a schematic diagram of architecture of an IoT system according to an embodiment of the present disclosure.

FIG. 1 illustrates a schematic diagram of architecture of an IoT system according to an embodiment of the present disclosure. As shown in FIG. 1, the IoT system comprises a network device 10 and a terminal device 20. The Internet may serve as a first network, and the network device 10 operates in an Internet environment and has a first network address in the Internet. The intranet (i.e., a local area network) may serve as a second network, and the terminal device 20 operates in an intranet environment and has a second network address in the intranet. In FIG. 1, the network device 10 is disposed in the cloud and may comprise a cloud system 110 and a protocol broker 120. The cloud system 110 comprises an IoT service center 111, a device mapping configuration management service 112, a first network forwarding service 113, and a first client 114 (which is an MQTT client in the present embodiment). The protocol broker 120 may comprise an MQTT server. The IoT service center 111, the device mapping configuration management service 112, the first network forwarding service 113, the MQTT client 114, and the MQTT server are communicatively connected to each other. The terminal device 20 comprises a second client 210 (which is an MQTT client in the present embodiment) and a terminal application 220. In some embodiments, the terminal device 20 further comprises a second network forwarding service 230. The second client 210, the second network forwarding service 230, and the terminal application 220 are communicatively connected to each other. Since the cloud system 110 and the terminal device 20 operate in different network environments, data transmission may not be directly performed between the cloud system 110 and the terminal device 20. In the embodiment of the present disclosure, data transmission between the network device 10 and the terminal device 20 is realized through the first client 114, the protocol broker 120, and the second client 210 based on the MQTT protocol. The data transmission between the network device 10 and the terminal device 20 will be described in detail in the following embodiments.

The IoT service center 111, the device mapping configuration management service 112, the first network forwarding service 113, the MQTT client 114, and the MQTT server described above may be implemented by software, hardware, or a combination thereof. For example, each of the IoT service center 111, the device mapping configuration management service 112, the first network forwarding service 113, the MQTT client 114, and the MQTT server may be implemented by a software module or a hardware entity comprising, but not limited to, a computer, a server, a desktop, a laptop, or other computing devices having a processing capability. The terminal device 20 may be implemented by a hardware device.

By way of example, the network device 10 may be implemented as a hardware device comprising a memory and a processor, wherein the memory has stored therein processor-executable instructions which, when executed by the processor, cause the processor to perform the data transmission method on the first network side described above. The terminal device 20 may be implemented as a hardware device comprising a memory and a processor, wherein the memory has stored therein processor-executable instructions which, when executed by the processor, cause the processor to perform the data transmission method on the second network side described above.

As another example, the cloud system 110 is implemented by a first computer and the protocol broker 120 is implemented by a second computer. Each of the IoT service center 111, the device mapping configuration management service 112, the first network forwarding service 113, and the MQTT client 114 in the cloud system 110 is implemented as a software module installed in the first computer. The MQTT server in the protocol broker 120 is implemented as a software module installed in the second computer. The terminal device 20 is a hardware device comprising a memory and a processor, and each of the second client 210, the terminal application 220, and the second network forwarding service 230 described above is implemented as a software module installed in the terminal device.

Figure 2:
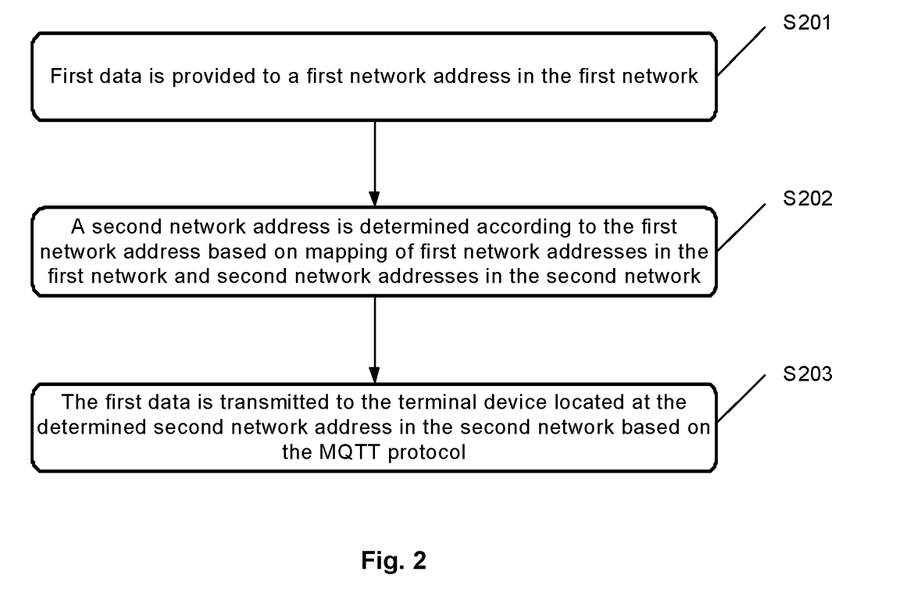
FIG. 2 is a schematic flowchart of a data transmission method performed on a first network side according to an embodiment of the present disclosure.

FIG. 2 is a flowchart of a data transmission method performed on the first network side (for example, the cloud side) according to an embodiment of the present disclosure. The data transmission method may be performed by the network device described above.

In step S201, first data is provided to a first network address in the first network. For example, the device mapping configuration management service may configure one virtual terminal device in the first network forwarding service for each terminal device in the second network, and configure, for a second network address of each terminal device in the second network, a mapped first network address of the virtual terminal device in the first network. The IoT service center may transmit the first data to a first network forwarding service according to a first network address of a virtual terminal device provided by the first network forwarding service.

In step S202, a second network address is determined according to the first network address based on mapping of first network addresses in the first network and second network addresses in the second network. For example, the first network forwarding service of the cloud system may determine a second network address of a terminal device in the second network which is mapped to the first network address of the virtual terminal device which is provided by the first network forwarding service in the first network.

In step S203, the first data is transmitted to the terminal device located at the determined second network address in the second network based on the MQTT protocol. For example, the first network forwarding service of the cloud system may forward the first data to the first client according to the second network address. The first client of the cloud system may transmit the first data to the terminal device located at the determined second network address in the second network through a network tunnel based on the MQTT protocol. For example, the first client may encapsulate the first data into content of a first topic conforming to the MQTT protocol and transmit the encapsulated content to the protocol broker according to the second network address. The protocol broker transmits the content of the first topic to a second client of the terminal device which subscribes to the first topic, so that the second client receives the content of the first topic, and forwards the first data in the content of the first topic to a terminal application in the terminal device which subscribes to the first topic for processing.

Figure 3:
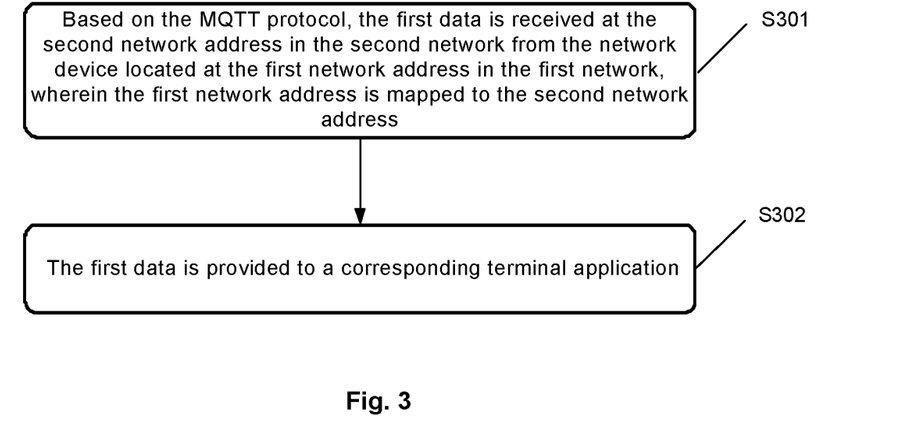
FIG. 3 is a schematic flowchart of a data transmission method performed on a second network side according to an embodiment of the present disclosure.

FIG. 3 is a schematic flowchart of a data transmission method performed on the second network side (for example, the terminal side) according to an embodiment of the present disclosure. The data transmission method may be performed by the terminal device described above.

In step S301, based on the MQTT protocol, the first data may be received at the second network address in the second network from the network device located at the first network address in the first network, wherein the first network address is mapped to the second network address. For example, the second client of the terminal device may receive the first data from the first client of the cloud system through the network tunnel based on the MQTT protocol. For example, the terminal device may pre-subscribe to the first topic related to the first data from the protocol broker. After the protocol broker publishes the first topic, the terminal device may receive content of the published first topic, and extract the first data from the content of the first topic, wherein the content of the first topic comprises the first data from the network device located at the first network address in the first network.

In step S302, the first data is provided to a respective terminal application. For example, the terminal device may forward the first data to a terminal application which subscribes to the topic to which the first data belongs for processing.

It should be illustrated that, in S201, a virtual terminal device is provided by the first network forwarding service operating on the cloud, such that the first network forwarding service pretends to be the virtual terminal device. The virtual terminal device provided by the first network forwarding service has a first network address in the first network. The virtual terminal receives a request from a connection management device at the IoT service center on the cloud side and establishes a connection with the IoT service center. The IoT service center transmits the first data to the first network forwarding service.

It should be illustrated that, in S202, since the IoT service center on the cloud side and the terminal device do not operate in the same network, a network address of the IoT service center is the first network address, and a network address of the terminal device is the second network address. The first network address of the IoT service center may be associated with one or more second network addresses according to mapping of first network addresses of the IoT service center on the cloud side and second network addresses of the terminal device on the terminal side, and interaction may be performed between two addresses associated with each other.

It should be illustrated that, in S203, the first client on the cloud side transmits the first data to the second client on the terminal side through the network tunnel based on the MQTT protocol. The network tunnel is established to realize data transmission between the cloud side and the terminal side.

It should be illustrated that, in S301, the second client on the terminal side receives the first data transmitted by the first client on the cloud side through the network tunnel based on the MQTT protocol, and after receiving the first data, the second client feeds back feedback data (second data) to the first client on the cloud side through the protocol broker.

It should be illustrated that, in S302, the second client in the terminal device forwards the received first data to the terminal application of the topic to which the first data belongs for processing.

In the embodiment of the present disclosure, data transmission from the network device in the first network to the terminal device in the second network is realized based on the MQTT protocol by establishing the mapping of first network addresses in the first network and second network addresses in the second network. In some embodiments, data transmission from the terminal device in the second network to the network device in the first network may also be realized. For example, the first network forwarding service in the first network may provide a virtual terminal device located in the first network, which is associated with the terminal device located in the second network, so that the IoT service center in the first network may communicate with the first network forwarding service based on the first network address. After the first network forwarding service converts the first network address into the second network address, the first network forwarding service may interact with the terminal device based on the second network address. The first client in the first network may communicate with the terminal device in the second network based on the MQTT protocol (through, for example, the network tunnel based on the MQTT protocol), so as to implement interaction between devices in different network segments.

A network segment mapping and network tunnel establishment method in the above method will be described below with reference to FIG. 4.

Figure 4:
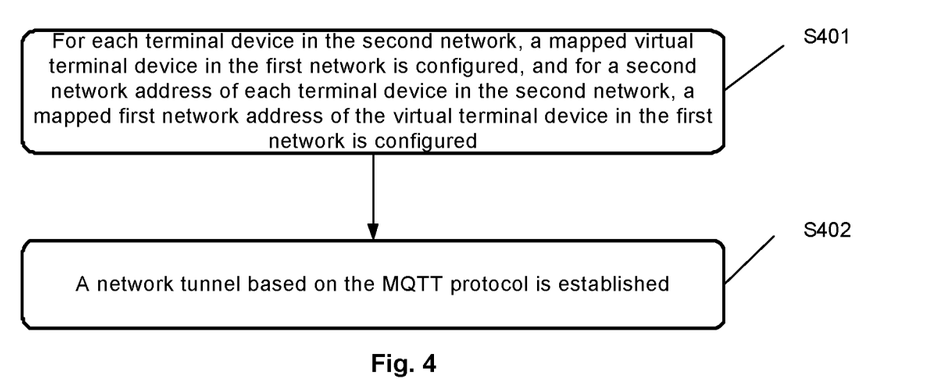
FIG. 4 is a schematic flowchart of a network segment mapping and network tunnel establishment method according to an embodiment of the present disclosure.

FIG. 4 illustrates a flowchart of a network segment mapping and network tunnel establishment method according to an embodiment of the present disclosure.

In step S401, for each terminal device in the second network, a mapped virtual terminal device in the first network is configured, and for a second network address of each terminal device in the second network, a mapped first network address of the virtual terminal device in the first network is configured. This operation may be performed by, for example, the device mapping configuration management service of the network device.

In step S402, a network tunnel based on the MQTT protocol is established.

For example, the first client of the cloud system, as a publisher of a message, may encapsulate the first data into the content of the first topic according to the MQTT protocol and publish the encapsulated content through the protocol broker. The second client of the terminal device, as a subscriber, may pre-subscribe to the first topic, receive the content of the first topic through the protocol broker, and extract the first data from the content of the first topic. The second network forwarding service of the terminal device may forward the first data to the respective terminal application.

The second client of the terminal device receives data (for example, second data) returned from the terminal application, and, as a publisher of the message, encapsulates the second data into content of a second topic according to the MQTT protocol and publishes the encapsulated content through the protocol broker. The first client in the cloud system, as a subscriber of the message, may pre-subscribe to the second topic, receive the content of the second topic through the protocol broker and extract the second data from the content of the second topic. The first client in the cloud system may provide the second data to the respective virtual terminal device in the first network forwarding service, so that the second data is provided from the virtual terminal device to the IoT service center.

The mapping of a plurality of second network addresses and a plurality of first network addresses may be configured and managed by the device mapping configuration management service. For example, for a second network address of each terminal device, a mapped first network address of a virtual terminal device may be configured, and according to the configuration, the first network forwarding service is dynamically notified to start or stop the pretended virtual terminal device to perform communication between a device on the cloud side and a device on the terminal side. The device mapping configuration management service may also monitor an operating state of the first network forwarding service.

For example, it is assumed that an Internet Protocol (IP) address of the network service center on the cloud side in the first network is 3X.1XX.7X.1X, a terminal application initiated by a terminal device AP1 on the terminal side is a Transmission Control Protocol (TCP) service, a monitoring port PORT is 7800, and an IP address in the second network is 192.168.0.5. At this time, a monitoring port PORT of a TCP service initiated locally on the cloud side is 6001. When the IoT service center on the cloud side needs to add the terminal device AP1 on the terminal side, the first network forwarding service operating on the cloud side provides (i.e. pretends to be) a virtual terminal device. Table 1 illustrates mapping of first network addresses and second network addresses. As shown in Table 1, an IP address and a port 192.168.0.5:7800 (first network address) in the second network are mapped to an IP address and a port 3X.1XX.7X.1X: 6001 (second network address) in the first network. The IoT service center establishes a connection with the first network forwarding service having a first network address of 3X.1XX.7X.1X:6001, and transmits the first data to the first network forwarding service. The first network forwarding service forwards the first data to the first client on the cloud side. The first client on the cloud side transmits the first data to the terminal device having a second network address of 192.168.0.5:7800 on the terminal side through the network tunnel based on the MQTT protocol.

TABLE 1

| Terminal device AP1 | IP address | Port |
|---|---|---|
| Second network address on a terminal side | 192.168.0.5 | 7800 |
| First network address on a cloud side | 3X.1XX.7X.1X | 6001 |

It should be illustrated that, according to the above step S402, in a possible implementation, the first client on the cloud side serves as a publisher, the second client on the terminal side serves as a subscriber. The second client subscribes to a message containing a first topic, and the first client transmits the message containing the first topic to the second client through the protocol broker according to the MQTT protocol. After receiving a subscription message containing the first topic, the second client provides the first client with feedback to the subscription message of the first topic through the protocol broker according to the MQTT protocol.

It should be illustrated that, in the above implementation, there may be one first client on the cloud side, there may be one or more second clients on the terminal side, and the first client on the cloud side may transmit the subscription message of the first topic to the one or more second clients on the terminal side at the same time, to facilitate the first client on the cloud side managing and monitoring the one or more second clients on the terminal side.

In another possible implementation, the second client on the terminal side serves as a publisher, the first client on the cloud side serves as a subscriber. The first client subscribes to a message containing a second topic, and the second client transmits the message containing the second topic to the first client through the protocol broker according to the MQTT The protocol. After receiving a subscription message containing the second topic, the first client provides the second client with feedback to the subscription message of the second topic through the protocol broker according to the MQTT protocol.

It should be illustrated that, the above implementation is similar to the implementation in which the first client transmits a subscription message to the second client, except that there may be one second client on the terminal side and one first client on the cloud side, and the second client transmits the subscription message to the first client in a one-to-one manner, to facilitate the second client on the terminal side timely and accurately searching for and adding the first client on the cloud side, and establishing a connection therebetween for data transmission.

Figure 5A:
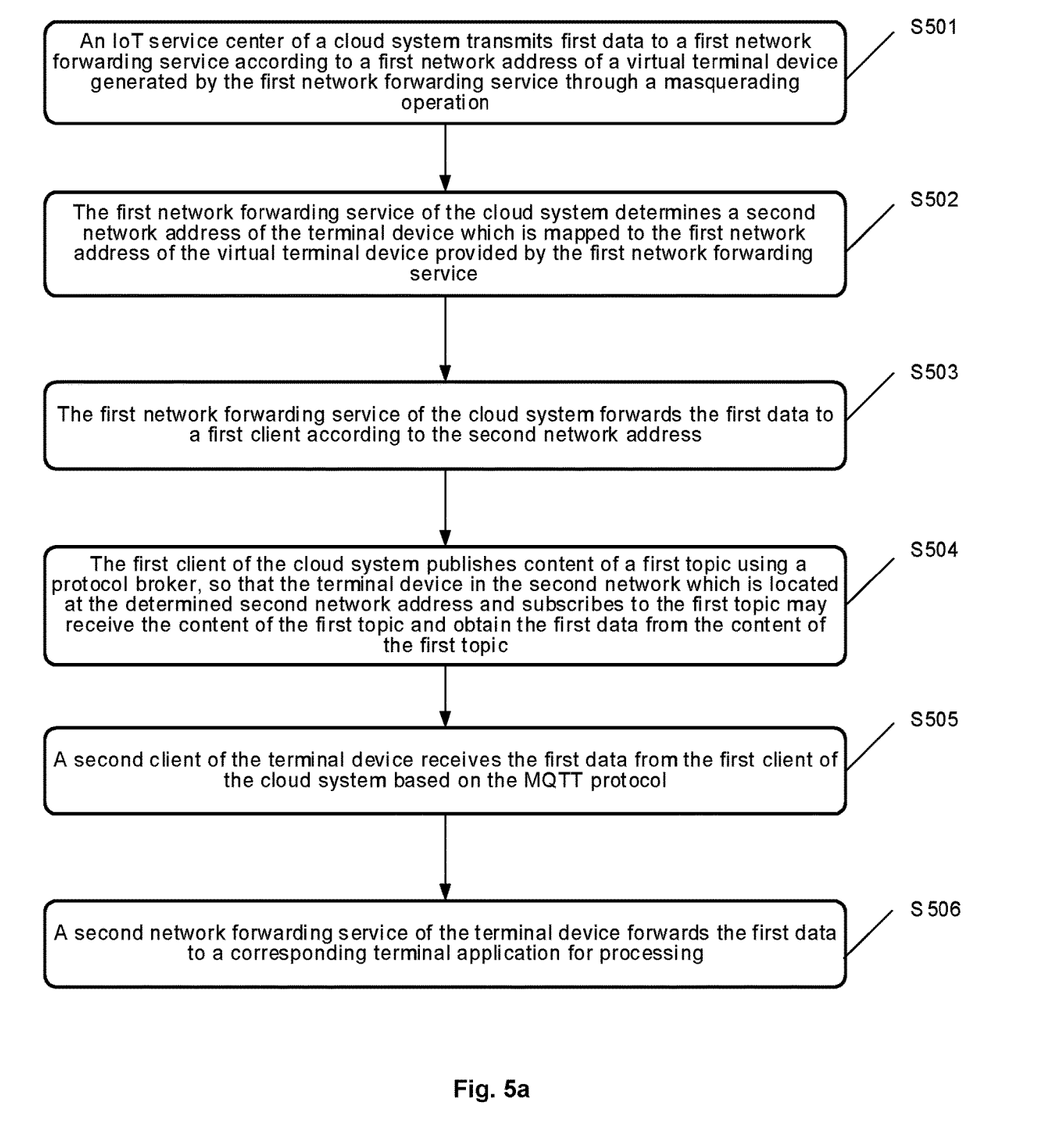
FIG. 5a is a schematic flowchart of a data transmission method based on a Message Queuing Telemetry Transport (MQTT) protocol according to an embodiment of the present disclosure.

FIG. 5a is a schematic flowchart of a data transmission method based on an MQTT protocol according to an embodiment of the present disclosure. The data transmission method is related to data transmission from a network device in a first network to a terminal device in a second network.

In step S501, an IoT service center of a cloud system transmits first data to a first network forwarding service according to a first network address of a virtual terminal device provided by the first network forwarding service.

In step S502, the first network forwarding service of the cloud system determines a second network address of the terminal device which is mapped to the first network address of the virtual terminal device provided by the first network forwarding service.

In step S503, the first network forwarding service of the cloud system forwards the first data to a first client according to the second network address.

In step S504, the first client of the cloud system publishes content of a first topic using a protocol broker, so that the terminal device which is located at the determined second network address in the second network and subscribes to the first topic may receive the content of the first topic and obtain the first data from the content of the first topic. For example, the first client of the cloud system may encapsulate the first data into the content of the first topic according to the MQTT protocol, and transmit the encapsulated content to the protocol broker according to the second network address. The protocol broker may publish the content of the first topic, so that the terminal device which is located at the determined second network address in the second network and subscribes to the first topic may receive the content of the first topic and obtain the first data from the content of the first topic.

In step S505, a second client of the terminal device receives the first data from the first client of the cloud system based on the MQTT protocol (through, for example, a network tunnel based on the MQTT protocol).

In step S506, a second network forwarding service of the terminal device forwards the first data to a respective terminal application (which, for example, subscribes to the topic to which the first data belongs) for processing.

Figure 5B:
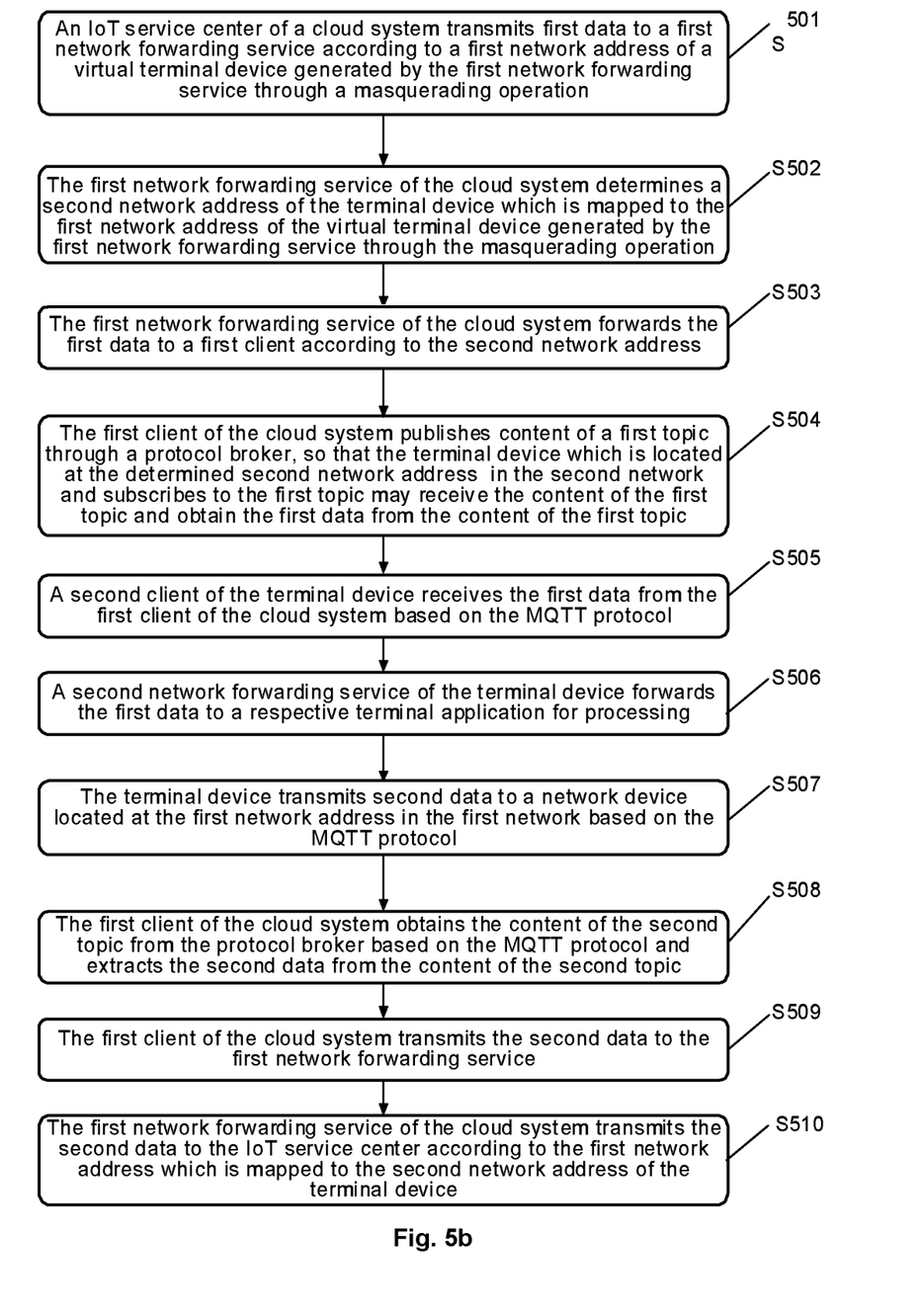
FIG. 5b is a schematic flowchart of a data transmission method based on an MQTT protocol according to another embodiment of the present disclosure.

FIG. 5b is a schematic flowchart of a data transmission method based on an MQTT protocol according to another embodiment of the present disclosure. The data transmission method is related to data transmission between a network device in a first network and a terminal device in a second network. The flowchart of FIG. 5b is similar to that of FIG. 5a, except that, in addition to the above steps S501-S506, the following steps are comprised.

In step S507, the terminal device transmits second data to a network device located at the first network address in the first network based on the MQTT protocol. For example, the second client of the terminal device may encapsulate second data from a terminal application into content of a second topic according to the MQTT protocol, and transmit the encapsulated content to the protocol broker according to the second network address of the terminal device. The protocol broker publishes the content of the second topic, so that a network device in the first network which subscribes to the second topic and is located at the first network address may receive the content of the second topic and obtain the second data from the content of the second topic.

In step S508, the first client of the cloud system obtains the content of the second topic from the protocol broker based on the MQTT protocol and extracts the second data from the content of the second topic. The first client pre-subscribes to the second topic from the protocol broker, and after the protocol broker publishes the second topic, the first client may receive the content of the second topic from the protocol broker, and extract, from the content of the second topic, the second data originating from the second network address.

In step S509, the first client of the cloud system transmits the second data to the first network forwarding service.

In step S510, the first network forwarding service of the cloud system transmits the second data to the IoT service center according to the first network address which is mapped to the second network address of the terminal device.

Figure 6:
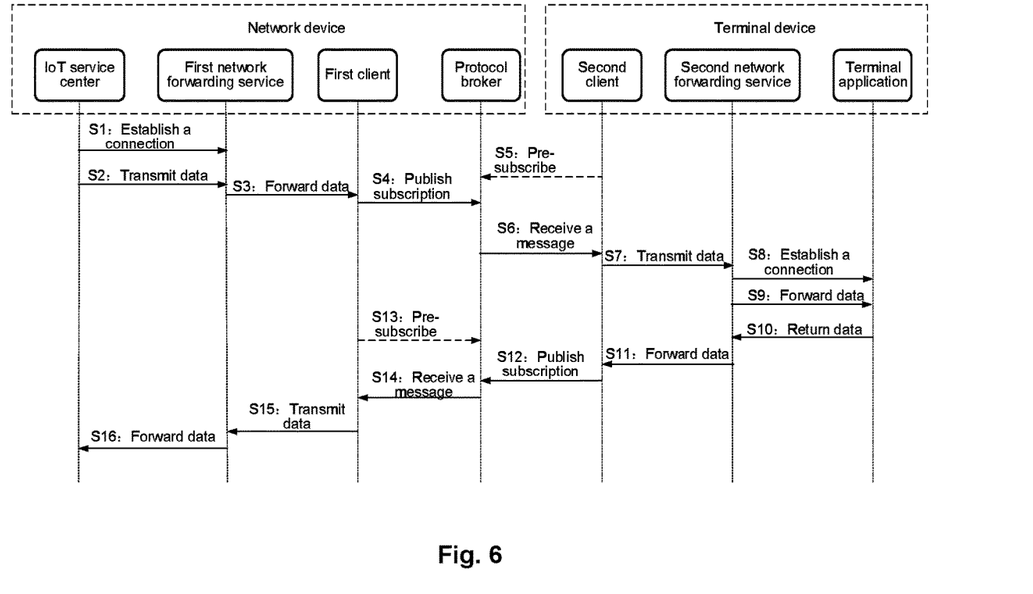
FIG. 6 is a signaling diagram of a data transmission method according to an embodiment of the present disclosure.

FIG. 6 is a signaling diagram of a data transmission method according to an embodiment of the present disclosure. As shown in FIG. 6, a network device comprising an IoT service center, a first network forwarding service, a first client, and a protocol broker is in a first network (on, for example, a cloud side), and a terminal device comprising a second client, a second network forwarding service and a terminal application is in a second network (on, for example, a terminal side).

In S1, the IoT service center on the cloud side establishes a connection with the first network forwarding service.

In S2, the IoT service center transmits first data to the first network forwarding service according to a first network address of a virtual terminal device which is provided by the first network forwarding service. A first network address of the virtual terminal device provided by the first network forwarding service in the first network has a preset mapping relationship with a second network address of the terminal device in the second network.

In S3, the first network forwarding service on the cloud side forwards the first data to the first client according to the second network address.

In S4 to S7, the first client on the cloud side and the second client on the terminal side perform data transmission from the cloud side to the terminal side through a network tunnel which is established based on the MQTT protocol. Specifically, in S4, the first client publishes subscription information having a first topic to the protocol broker, for example, the first client may encapsulate the first data into content of the first topic and transmit the encapsulated content to the protocol broker to be published by the protocol broker. Before S4, the second client pre-subscribes to the content of the first topic from the protocol broker in S5, so that based on the MQTT protocol, the first client serves as a publisher and the second client serves as a subscriber. After the protocol broker publishes subscription in S4, in S6, the second client may obtain the content of the first topic from the protocol broker based on the MQTT protocol and extract the first data from the content of the first topic. In S7, the second client transmits the first data to the second network forwarding service.

In S8, the second network forwarding service on the terminal side establishes a connection with the terminal application.

In S9, the second network forwarding service on the terminal side forwards the received first data to the terminal application in the terminal device through the established connection.

In S10, the terminal application on the terminal side provides the second data (for example, data returned by the terminal application) to the second network forwarding service.

In S11, the second network forwarding service on the terminal side forwards the second data to the second client.

In S12, the second client on the terminal side may encapsulate the second data into content of a second topic, and publish subscription to the protocol broker according to the second network address.

Before S12, the first client on the cloud side pre-subscribes to the content of the second topic from the protocol broker in S13, so that based on the MQTT protocol, the first client serves as a subscriber and the second client serves as a publisher.

After the protocol broker publishes subscription in S12, in S14, the first client on the cloud side obtains the content of the second topic from the protocol broker and extracts the second data from the content of the second topic.

In S15, the first client on the cloud side transmits the received second data of the second topic to the first network forwarding service on the cloud side.

In S16, the first network forwarding service on the cloud side forwards the second data to an Internet service center according to a mapping relationship between second network addresses and first network addresses. In some embodiments, the first client may further return a response indicating that the second data is received to the second client.

Figure 7:
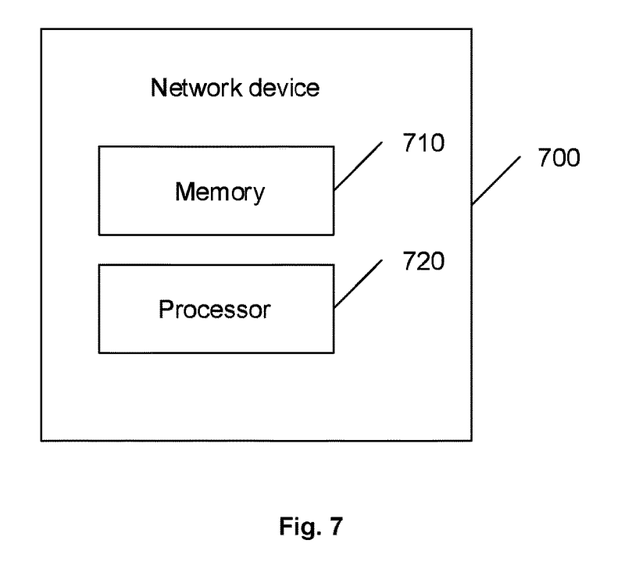
FIG. 7 is a schematic structural diagram of a network device according to an embodiment of the present disclosure.

FIG. 7 is a schematic structural diagram of a network device according to an embodiment of the present disclosure. As shown in FIG. 7, the network device 700 comprises a memory 710 and a processor 720. The memory 710 has stored thereon instructions executable by the processor 720 which, when executed by the processor 720, cause the processor 720 to perform the data transmission method described above, for example, the data transmission method performed on the first network side.

Figure 8:
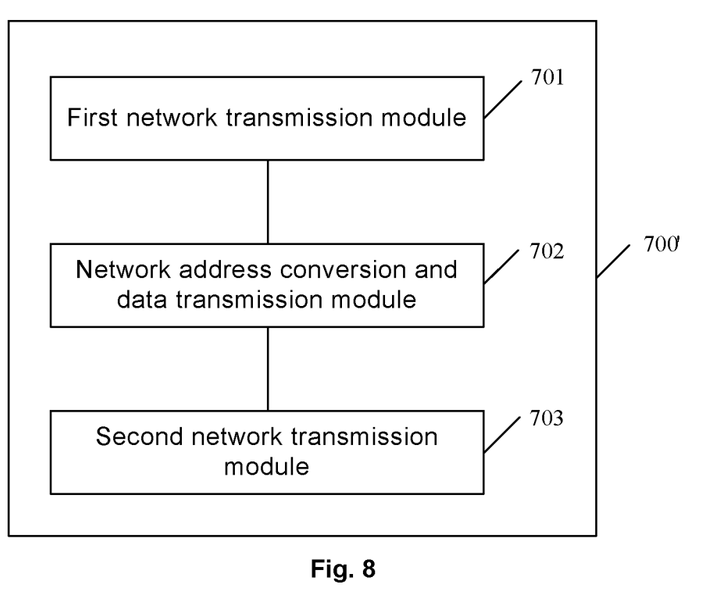
FIG. 8 is a schematic structural diagram of a network device according to another embodiment of the present disclosure.

FIG. 8 is a schematic structural diagram of a network device according to another embodiment of the present disclosure. As shown in FIG. 8, the network device 700' comprises a first network transmission module 701, a network address conversion and data transmission module 702, and a second network transmission module 703.

The first network transmission module 701 is configured to invoke the IoT service center to transmit first data to the first network forwarding service on the cloud side according to a first network address of a virtual terminal device provided by the first network forwarding service on the cloud side.

The network address conversion and data transmission module 702 is configured to invoke the first network forwarding service on the cloud side to forward the first data transmitted by the first network transmission module 701 to the first client according to a second network address mapped to the first network address.

The second network transmission module 703 is configured to invoke the first client to transmit the first data forwarded by the network address conversion and data transmission module 702 to the terminal device located in the second network through a network tunnel based on the MQTT protocol, so that the terminal device invokes the second client to forward the first data to the terminal application which subscribes to a topic to which the first data belongs for processing.

Figure 9:
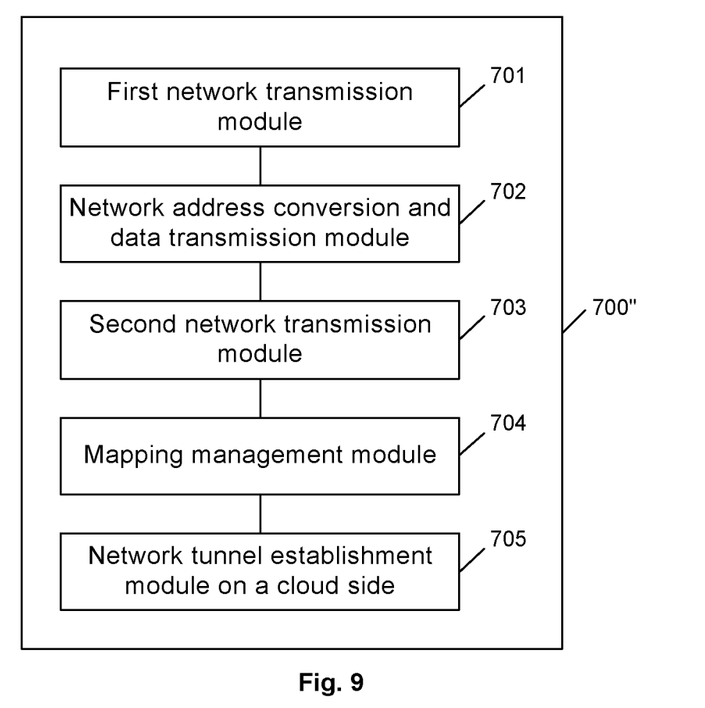
FIG. 9 is a schematic structural diagram of a network device according to still another embodiment of the present disclosure.

FIG. 9 is a schematic structural diagram of a network device according to still another embodiment of the present disclosure. As shown in FIG. 9, the network device 700' is similar to the network device 700, at least except that the network device 700' further comprises a mapping management module 704.

The mapping management module 704 is configured to invoke the device mapping configuration management service to configure, for each terminal device in the second network, a mapped virtual terminal device in the first network, and configure, for a second network address of each terminal device, a mapped first network address of the virtual terminal device.

In some embodiments, as shown in FIG. 9, the network device 700" may further comprise a network tunnel establishment module 705 on the cloud side.

The network tunnel establishment module 705 on the cloud side is configured to invoke the first client to transmit a published message of the first topic to a second client in each terminal device through the protocol broker according to the MQTT protocol, so that the second client feeds back a subscription message of the first topic to the protocol broker according to the MQTT protocol. The network tunnel establishment module 705 on the cloud side is further configured to, after invoking the first client to receive information of a second topic provided by the second client through the protocol broker, invoke the first client to feed back a subscription message of the second topic to the protocol broker.

The network device according to the embodiments of the present disclosure may perform the data transmission method performed on the first network side described above, for example, the data transmission method comprising steps S201-S203, the method for establishing network tunnel based on the MQTT protocol on the first network side (the cloud side) in steps S401 and S402, and the data transmission method comprising steps S501-S504 and S508-S510, which will not be described here again.

Figure 10:
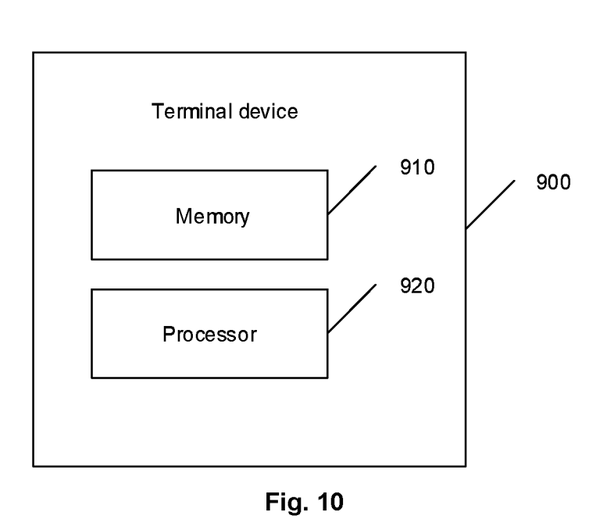
FIG. 10 is a schematic structural diagram of a terminal device according to an embodiment of the present disclosure.

FIG. 10 is a schematic structural diagram of a terminal device according to an embodiment of the present disclosure. As shown in FIG. 10, the terminal device 900 comprises a memory 910 and a processor 920. The memory 910 has stored thereon instructions executable by the processor 920 which, when executed by the processor 920, cause the processor 920 to perform the data transmission method described above, for example, the data transmission method performed on the second network side.

Figure 11:
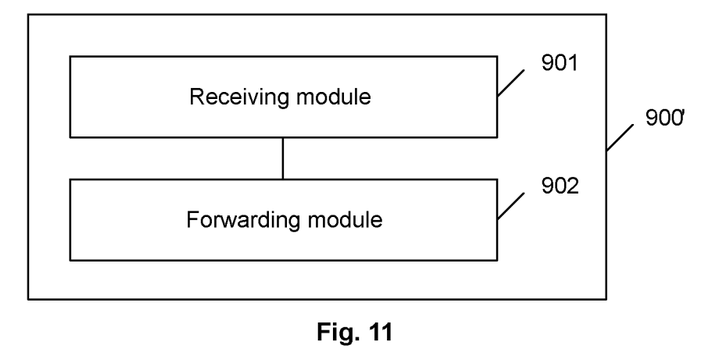
FIG. 11 is a schematic structural diagram of a terminal device according to another embodiment of the present disclosure.

FIG. 11 is a schematic structural diagram of a terminal device according to another embodiment of the present disclosure. As shown in FIG. 11, the terminal device 900' comprises a receiving module 901 and a forwarding module 902.

The receiving module 901 is configured to invoke the second client to receive first data from the first client of the cloud system through a network tunnel based on the MQTT protocol.

The forwarding module 902 is configured to forward the first data to a terminal application which subscribes to a topic to which the first data belongs for processing.

Figure 12:
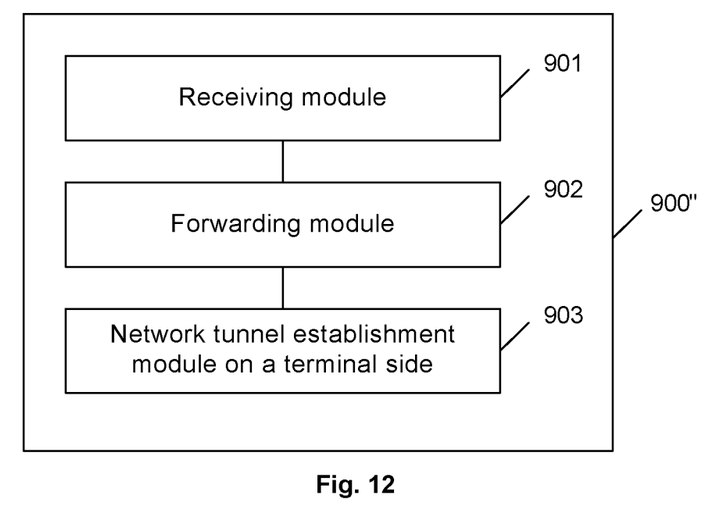
FIG. 12 is a schematic structural diagram of a terminal device according to still another embodiment of the present disclosure.

FIG. 12 is a schematic structural diagram of a terminal device according to still another embodiment of the present disclosure. As shown in FIG. 12, the terminal device 900" is similar to the terminal device 900', at least except that the terminal device 900" further comprises a network tunnel establishment module 903 on the terminal side.

The network tunnel establishment module 903 on the terminal side is configured to: after invoking the second client to receive information of the first topic provided by the first client through the protocol broker, forward the information to the terminal application; and after receiving a subscription message of the first topic from the terminal application through the second client, feed back the subscription message of the first topic to the protocol broker; and after receiving information of the second topic published by the terminal application through the second client, invoke the second client to transmit the published message of the second topic to the first client in the cloud system through the protocol broker according to the MQTT protocol, so that the first client feeds back a subscription message of the second topic to the protocol broker according to the MQTT protocol.

The terminal device according to the embodiment of the present disclosure may perform the data transmission method performed on the second network side described above, for example, the data transmission method comprising steps S301-S302, the network tunnel establishment method based on the MQTT protocol on the second network side (the terminal side) in step S402, and the data transmission method comprising steps S505-S507, which will not be described here again.

The embodiments of the present disclosure further provide a computer readable storage medium, having stored thereon a computer program which, when executed by the processor, implements the data transmission method on the first network side described above, for example, the data transmission method comprising steps S201-S203, the network tunnel establishment method based on the MQTT protocol on the cloud side in steps S401 and S402, the data transmission method comprising steps S501-S504, and the data transmission method comprising steps S508-S510, which will not be described here again.

The embodiments of the present disclosure further provide a computer readable storage medium, having stored thereon a computer program which, when executed by the processor, implements the data transmission method on the second network side described above, for example, the data transmission method comprising steps S301-S302, the network tunnel establishment method based on the MQTT protocol on the terminal side in step S402, and the data transmission method comprising steps S505-S507, which have similar implementation principles, and will not be described here again.

It should be understood that although various steps in the flowcharts of the accompanying drawings are sequentially displayed as indicated by arrows, these steps are not necessarily performed in an order indicated by the arrows. Unless explicitly stated herein, an execution order of these steps is not strictly limited, and these steps may be performed in another order. Further, at least some of the steps in the flowcharts of the accompanying drawings may comprise a plurality of sub-steps or phases, which are not necessarily performed at the same time, but may be executed at different times, and an execution order thereof is also not necessarily performed sequentially, but may be performed in turn or alternately with at least some of other steps or sub-steps or phases of other steps.

The above description is only some of embodiments of the present disclosure, and it should be illustrated that those of ordinary skill in the art may also make several improvements and modifications without departing from the principles of the present disclosure, and these improvements and modifications should also be considered as falling within the protection scope of the present disclosure.

We claim:

1. A data transmission method, comprising: on a first network side including a first network forwarding service, a first client, and a protocol broker,
providing first data to a first network address in a first network, wherein the first network address is for a virtual terminal device, the virtual terminal device is configured for a terminal device in a second network by using the first network forwarding service;
determining, by using the first network forwarding service, based on mapping of first network addresses in the first network and second network addresses in the second network, a second network address according to the first network address, wherein the mapping includes a mapping between the first network address and a network address of the terminal device in the second network;
transmitting the first data to a terminal device located at the determined second network address in the second network based on a Message Queue Telemetry Transmission (MQTT) protocol;
receiving second data from the terminal device in the second network based on the MQTT protocol, the terminal device comprising a second forwarding service and a second client,
wherein the first network is Internet and the second network is local area network;
wherein transmitting the first data to a terminal device located at the determined second network address in the second network based on an MQTT protocol comprises: based on the MQTT protocol,
encapsulating the first data into content of a first topic by using the first client; and
publishing the content of the first topic to the protocol broker by using the first client, so that the terminal device which is located at the determined second network address in the second network and subscribes to the first topic is capable of receiving the content of the first topic and obtaining the first data from the content of the first topic by using the second client of the terminal device;
wherein receiving second data from a terminal device in the second network based on the MQTT protocol comprises, based on the MQTT protocol,
pre-subscribing, by using the first client, to a second topic related to second data;
receiving, by using the first client, a content of the second topic which is forwarded from the second network forwarding service of the terminal device in the second network to the second client of the terminal device in the second network and published to the protocol broker according to the second network address by the second client of the terminal device in the second network; and
obtaining, by using the first client, the second data from the content of the second topic.

2. The data transmission method according to claim 1, wherein before determining the second network address, the method further comprises: establishing the mapping of the first network addresses in the first network and the second network addresses in the second network by:
configuring, for each terminal device in the second network, a mapped virtual terminal device in the first network, and configuring, for a second network address of each terminal device in the second network address, a mapped first network address of the virtual terminal device in the first network.

3. The data transmission method according to claim 2, wherein providing the first data to the first network address in the first network comprises:
providing the first data to the mapped virtual terminal device located at the first network address in the first network.

4. The data transmission method according to claim 1, further comprising:
determining, based on the mapping of the first network addresses in the first network and the second network addresses in the second network, the first network address according to the second network address of the terminal device which provides the second data in the second network.

5. A network device, comprising a memory and a processor, the memory having stored therein instructions executable by the processor, wherein the instructions, when executed by the processor, cause the processor to perform the data transmission method according to claim 1.

6. A non-transitory computer readable storage medium, having stored thereon a computer program, wherein the computer program, when executed by a processor, implements the data transmission method according to claim 1.

7. The data transmission method according to claim 1, wherein the second data is a feedback data for the first data.

8. A data transmission method, comprising: on a second network side comprising a terminal device which includes a second network forwarding service and a second client,
receiving, by using the second client of the terminal device at a second network address in a second network, first data from a network device located at a first network address in a first network based on a Message Queue Telemetry Transmission (MQTT) protocol, wherein the first network address is mapped to the second network address;
providing the first data to a respective terminal application; and
transmitting second data to the network device located at the first network address in the first network based on the MQTT protocol, the network device comprising a first network forwarding service and a first client,
wherein the first network is Internet and the second network is local area network,
wherein receiving the first data from a network device located at a first network address in the first network comprises: based on the MQTT protocol,
pre-subscribing, by using the second client, to a first topic related to the first data;
receiving, by using the second client, a content of the first topic which is forwarded from the first forwarding service of the network device in the first network to the first client of the network device in the first network and published to a protocol broker of the first network by the first client of the network device in the first network, wherein the content of the first topic comprises the first data from the network device located at the first network address in the first network; and extracting, by using the second client, the first data from the content of the first topic, wherein transmitting second data to the network device located at the first network address in the first network based on the MQTT protocol comprises: based on the MQTT protocol, forwarding, by using the second network forwarding service, the second data to the second client;

encapsulating, by using the second client, the second data into content of a second topic; and publishing, by using the second client, the content of the second topic to the protocol broker of the first network according to the second network address, so that the network device in the first network which subscribes to the second topic and is located at the first network address is capable of receiving the content of the second topic and obtaining the second data from the content of the second topic.

9. A non-transitory computer readable storage medium, having stored thereon a computer program, wherein the computer program, when executed by a processor, implements the data transmission method according to claim 8.

10. A terminal device, comprising a memory and a processor, the memory having stored therein instructions executable by the processor, wherein the instructions, when executed by the processor, cause the processor to perform the data transmission method according to claim 8.

* * * * *